March 13, 1962  F. L. DILLINGHAM  3,024,537
LOG MEASURING OR SCALING DEVICE
Filed April 23, 1959
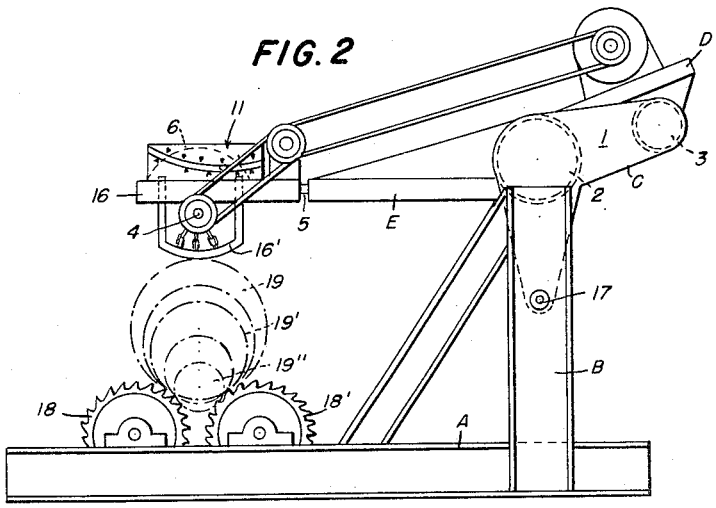
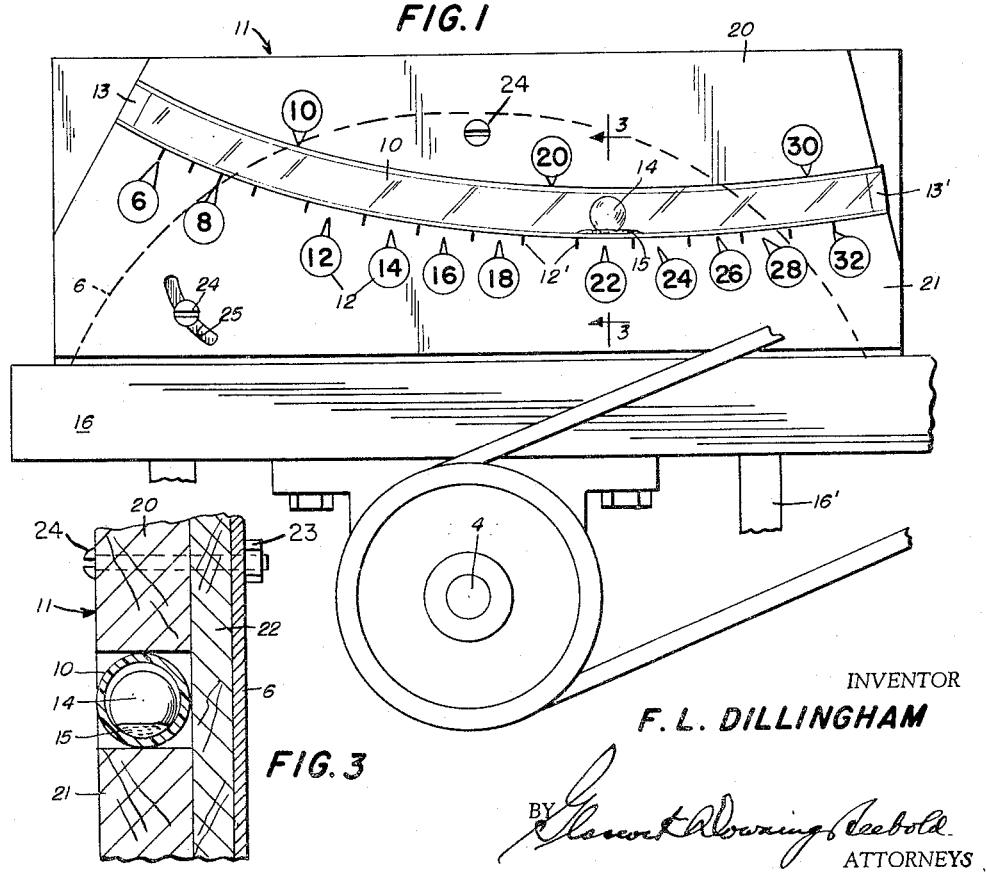
INVENTOR
F. L. DILLINGHAM
BY
ATTORNEYS 3,024,537
LOG MEASURING OR SCALING DEVICE
Frederick Laurence Dillingham, Munford, Ala., assignor to Soderhamn Machine Manufacturing Company, Talladega, Ala.
Filed Apr. 23, 1959, Ser. No. 808,518
7 Claims. (Cl. 33—178)

The present invention relates broadly to the art of measuring devices. More particularly, this invention relates to a device for measuring or indicating the size of an article.

Specifically, the invention relates to what can be termed a "Log Measuring or Scaling Device" that is attached to a debarking machine so as to permit the operator of such machine to readily determine the size of the log being debarked, in order that at the end of a run of logs, the amount of debarked wood can be readily estimated.

It has been found that it is desirable to determine, for instance, in the logging industry, not only the number of logs that have been processed, but the volumetric measurement of the lumber which of course is a function of their character. It is evident that the volume of pulp, for instance, that will be made from a given number of logs is dependent on the length and character of the logs. The lengths of logs from a particular logging operation are kept fairly uniform and it is the present practice to detail a man to measure the diameter of the logs. This of course adds to the payroll of the plant and in some cases the employee entrusted to this task has found it to be easier to guess at the diameter of the logs than to measure them. The results of this system have been found to be expensive and inaccurate.

In a plant where logs are debarked, especially where the logs are supported while being debarked, on bull wheels that rotate the log under a debarking device, there must be an employee at hand to operate the debarking device. It has been found that by use of the present invention the operator of the debarking machine may be automatically informed of the diameter of each log as it is processed in the machine.

Other industries also require means to quickly determine the size of objects passing over or along a conveyor and the device of the present invention is intended for such uses as well as for measuring logs.

It is, therefore, an object of the present invention to provide a measuring device adapted to be mounted on an arm means that is movable toward and away from the object to be measured and which device includes a movable indicator which moves in accordance with variations in the angular movement of the arm means to indicate the size of objects to be measured.

It is a primary object of the present invention, therefore, to provide such a measuring device so constructed and arranged that it can be mounted on such a debarking machine in a position such that as each log is being debarked the diameter of the log will be indicated.

It is a further object to provide such attachment in association with a debarking machine that includes a log supporting means incorporating laterally spaced rotatable components for positioning a log, an upright supporting means to one side of such first-mentioned supporting means, an overhanging arm or frame means pivoted to such last-mentioned supporting means for movement toward and away from the first-mentioned supporting means and carrying a bark-removing mechanism such as chain flails, rotary knife or abrasive means or other tools that operate on an axis parallel to the axis about which the overhanging arm is pivoted. Further, there can be associated with the bark-removing means, a feeler gauge or rider bar structure which rides on the wood surface of the log being debarked, and said attachment being mounted to be movable with the bark-removing means.

It is a further object of the present invention to provide a gauge device, to be supported over any log conveyor to successively engage the logs passing along said conveyor in order to determine and indicate their size.

It is a still further object of the invention to provide a gauging means that may be mounted over conveyors of various types by which the size of objects passing over the conveyor may be readily determined.

Other and further objects and advantages will become apparent from the following specification taken in connection with the accompanying drawing in which like characters of reference refer to similar elements in the several views and in which:

FIGURE 1 is a fragmentary and elevational view illustrating the measuring device of the invention as mounted on a tool carrying head frame of a debarking machine, FIGURE 2 is an end elevation on a reduced scale illustrating the measuring device of the invention as mounted on a debarking machine, the latter being illustrated diagrammatically, FIGURE 3 is a fragmentary cross-sectional view taken along line 3—3 of FIGURE 1.

While the measuring device or gauge of the present invention is not limited to utilization in the field of log debarking, it is especially adaptable to such field and can be employed on several types of debarking mechanisms. Debarking machines vary in construction and in mode of operation in dependence upon the structural details thereof. For example, as disclosed in my prior Patent 2,795,320, dated June 11, 1957, the debarking mechanism includes a frame having log supporting means capable of feeding a log longitudinally of its length, rotating the log about its axis while holding it stationary or feeding the log while turning it about its axis. To one side of that frame is a trackway structure along which a debarking mechanism is movable longitudinally of a log positioned on the supporting means. In that patent disclosure, the debarking mechanism includes an overhanging frame or arm structure at the outer end of which is the debarking means per se. This overhanging arm or frame structure is mounted for rocking movement toward and away from a log positioned on the supporting means. The logs can be debarked by traversing the carriage structure that carries the debarking means longitudinally of a supported log while the latter is rotated and assuming that the pivot point about which the arm means is stationary and remains so, the gauge of the invention can be mounted on the debarking head structure as described hereinafter. In other forms of debarking machines, the log supporting machines are in the form of radially spaced toothed wheels rotatable about parallel axes and arranged in transversely aligned pairs. An upstanding frame structure is located to one side of these wheels and a carriage is traversable along this frame structure. The carriage includes or supports an overhanging arm or subsidiary frame means that carries the debarking mechanism. In a machine of this character, the logs are fed so as to be positioned on the wheels, the latter are suitably turned to rotate the log and the subsidiary frame or arm means is moved toward the log until the debarking tools engage one end thereof whereupon the carriage is traversed longitudinally of the log to effect debarking thereof from end to end. In machines of this character, the subsidiary frame or overhanging arm means is normally mounted relative to a fixed turning axis and thus the height of that axis above the log supporting wheels is a fixed distance and the length of the arm means is usually a fixed factor as well as the diameter of and lateral spacing between the respective wheels of each pair of wheels. Therefore, the angular variation of the overhanging arm means that supports the debarking mechanism is a function of the size or diameter of different logs being debarked. Consequently, with the aforementioned fixed factors being known, the gauge of the invention can be initially accurately calibrated when made and sold as an attachment for all machines having these fixed factors.

The invention as illustrated is applicable to a machine of the last described type which includes a base frame A supporting laterally spaced toothed wheels arranged in longitudinally spaced pairs. The wheels 18, 18' are serrated and are suitably driven so as to impart rotary movement to a log positioned thereon by a suitable means not shown. To one side of the log supporting wheels is an upstanding frame structure denoted at B. The upstanding frame includes a pivot means denoted at 17 which supports a rockable subsidiary frame structure C. This subsidiary frame structure includes longitudinally spaced end plates 1, only one of which is shown, between which are fixed laterally spaced pipes 2 and 3, which form the longitudinally extending guide means on which a frame structure D is traversable, by means not shown. This frame structure D includes an overhanging arm portion E that moves vertically up and down in accordance with the rocking movement of the guideway about pivot 17. The mechanism for rocking the guideway is not shown, but may be a hydraulic cylinder and piston arrangement or any other force applying means that will effect up and down swinging movement of the frame or arm E and guideway about axis 17. At the outer end of the overhanging arm means E is mounted a debarking head frame 16, constructed and arranged similar to that disclosed in my above referred to prior patent. This head frame structure carries a rotary debarking means on an axis 4 which is parallel to the axis 17. The head 16 can rock about a pivot connection 5 and head levelling means not shown and as disclosed in my said prior patent are also incorporated with the debarking head frame. The rotary debarking means can be either chain flails or a rotary drum having bark removing knives projecting slightly beyond the periphery of the drum. In addition, instead of knives, the bark removing means can be raised weld beads extending longitudinally along the drum at circumferentially spaced points. Where flails are used, rider bars 16', as disclosed in my said prior patent are carried by the debarking head structure. The rider bars arranged at opposite ends of the head frame are so constructed and arranged that one rider bar will ride on the bark, while the other will ride on the wood from which the bark has been removed. This arrangement prevents the chain flails from removing too much of the wood layer.

It is, therefore, clear that as the various size logs 19, 19', 19" are positioned on the wheels 18, 18' and the frame rocked about axis 17, the rider bars and thus the flails are brought in contact with one end of the log, whereupon the frame is traversed along its guideway and the operating bark removing tools remove the bark from the logs.

The measuring device or gauge of the invention is constructed to be removably mounted on the housing or frame structure of the debarking head frame where it is readily visible to the operator of the debarking machine. The gauge includes a base or back plate 22 and two housing members 20 and 21 that support the gauge per se and which bear the scale or other indicia that indicate the measurement. The gauge per se is a tube 10 of clear plastic or glass that is curved or bowed downwardly. This tube is positioned between the housing members 20 and 21, which have the same thickness as the external diameter of tube 10 and the lower side of the housing member 20 conforms to the curvature of one side of the tube, while the upper side of housing 21 conforms to the curvature of the other side of the tube. The housing members are suitably fastened to the backing plate 22 and the side 6 of the shield that surrounds the debarking tool and which is a part of the debarking head frame, by bolt and nut means 24 and 23, the lower ones of which are cooperable with an arcuate slot 25 formed in housing piece 21 and plate 22 which permits tilting adjustment of the scale or measuring device relative to the debarking head frame, so as to insure that the indicia on the housing members are properly positioned relative to the tilting movement of the arm means E. The opposite ends of the tube 10 are closed by plugs 13, 13' and a ball 14 of steel or other heavy material is movable within the tube. This ball is as large as is consistent with its free movement along the tube and is visible within the transparent wall of the tube. Within the tube are a few drops of a heavy viscous fluid, such as glycerine, oil or other liquid that will remain fluid at low temperatures. This fluid is on both sides of the ball and its purpose is to control the speed with which the ball rolls along the interior of the tube and to cause the ball to come to rest adjacent a measuring station 12 with its corresponding scale marking or number in a minimum of time and also to prevent or suppress the ball from rolling back and forth along the tube, and to prevent the ball from jumping or vibrating. In addition, when any vibrations tend to move the ball away from the interior of the tube, the fluid will cushion the shock of the ball engaging the interior of the tube when the device is in use.

A series of numbers or marks such as 12, and 12' extend along the housing components 20, 21 and form a measuring scale. In this example, the numbers express the diameter in inches of logs being debarked. The scale is initially calibrated at the factory, assuming that it is to be used on a debarking machine in which the diameter of the wheels 18, 18' and the lateral spacing thereof is constant, the position of pivot 17 is constant and the length of the overhanging arm of frame E is constant. In calibrating the scale, a series of metal rings having diameters varying by one inch increments from 6 to approximately 36 inches are utilized. It being understood that the normal debarking machines operate on logs of from 6 to 36 inches in diameter. The measuring device is fastened to a standard barking machine, a 6 inch ring is placed on the wheels, and the frame is tilted down until the rider bar 16' engages the ring. The ball will then assume a position corresponding to that at which a 6 inch log is being debarked. At this position housing member 21 is marked to denote the numeral 6. The rings are then successively utilized in this fashion and the housing members are marked as shown to denote the diameter in inches of the different rings up to the highest permissible diameter consistent with the length of the tube and the capacity of the machine. Having calibrated the scale, the housing members can be produced in mass production and the scale markings stamped or embossed thereon. Usually the face of the housing members is one color and the scale markings are of a decidedly contrasting color for ease of observation.

A purchaser of the device of this invention having a machine in which some of the factors governing the movement of the ball relative to the scale markings are different from those of the standard machine can, in many instances, by manipulation of the scale device by reason of the arcuate slot 25 and the use of known diameter rings, mount the scale on his machine.

In other instances, it may be necessary for a purchaser of the measuring device to recalibrate the scale utilizing a set of rings as described above.

The calibration of the device will depend of course on the manner in which objects are supported. The calibration to accurately measure the diameters of logs supported as shown will be different from the calibration required if the logs were on a flat conveyor deck.

The scale 12, 12' must be calibrated to suit the specific installation. The curvature of the tube 10, if too flat will require an excessively long tube and, while giving greater opportunity for accuracy by extending the scale may well be both too bulky and too slow in following the changes of position in use. If the curvature is too sharp, too great a change of inclination of the frame is required to move the indicating ball a perceptible distance and the accuracy of the device is impaired.

As stated, where the device of FIG. 2 is to be mounted on a standard machine or under standard conditions the device can be manufactured complete with all the indicia in place. For other conditions, the device may be manufactured and sold without the indicia, which indicia 12, 12' will be added when the device is mounted and calibrated.

It is, therefore, clear that the measuring device of this invention includes an arcuate tube or passage having a rolling member therewithin and scale markings adjacent the tube or passage to indicate in accordance with the position of the rolling member, the size of objects to be measured. The support for the tube or passage means is mounted on an arm means extending outwards from a fixed pivot point and the objects to be measured are caused to be positioned beneath or pass under the arm, which moves up or down in relation to the height of the objects to be measured. This change in the degree of angle of the arm relative to its pivot point will cause the tube or passage to tilt inducing the rolling member such as a ball to roll along the interior thereof as the angle changes, until it comes to rest in that portion of the passage or tube which is level and the number opposite this position will indicate the diameter of the object being measured.

It is further clear that the scale or measuring device of this invention can also be mounted remotely of the objects to be measured and moved by a suitable length through angular variations induced by a feeler that engages the objects to be measured. In other words, a mechanical or electric servo-mechanism can be connected between a movable feeler and a tiltable scale device of this invention to move the tube or passage means through changes in angle induced by variation in movement of the feeler caused by engagement with different size objects.

The invention is found not to be limited to the precise structural details illustrated, since the essentials of the invention comprise a base or frame member means such as denoted at 11 that houses or delimits an arcuate passage, at least one face of which is transparent, a rolling contact member within such passage and movable therealong in accordance with up and down movement of the base and scale means adjacent and extending along the passage to indicate different measurements at those points at which the rolling contact member assumes a stationary position relative to the passage in accordance with changes in angular position of the base relative to a fixed pivot point.

What is claimed is:

1. A measuring device including an arcuate passage extending in a downwardly bowed direction, a rolling contact member within said passage, said passage having an exposed transparent face, a horizontally pivoted arm having a vertically movable free end, means mounting said passage at the free end of said arm so that the passage swings vertically in accordance with changes in the angular position of the arm, said rolling contact member being movable within the passage as the angular position of the latter changes, and indicia extending alongside the passage graduated upwards from the end thereof remote from the pivot for the arm to indicate the positions of said member at which the same is level in dependence upon changes in the vertical position of the passage.

2. A measuring device as claimed in claim 1 and a small mass of viscous fluid within said passage for cooperation with said rolling contact member to diminish the speed of movement thereof.

3. In a measuring device, a base member, complementary housing members secured thereto, said housing members having respective lower and upper spaced curved surfaces, a downwardly bowed transparent tube positioned between said surfaces, said housing members having a thickness substantially corresponding to the diameter of the tube, a horizontally pivoted arm including a vertically swingable free end, connecting means connecting said base member, housing members and tube to the free end of said arm for vertical movement therewith so that the angular position of said tube and base member varies in accordance with changes in the angular position of said arm, a ball within the tube and movable therealong as the angular position of the base member varies, means closing the opposite ends of the tube and scale markings on the respective housing members graduated upwards from the end of the tube adjacent to the free end of the arm toward the other end of the tube and calibrated with reference to the various positions of the ball within the tube to indicate measurements.

4. In a measuring device as claimed in claim 3 and a small mass of viscous fluid within the tube to retard the movement of the ball therewithin.

5. In a measuring device as claimed in claim 4 and one of said housing members having an arcuate slot therein, said base member having a similarly shaped slot therein and said connecting means including horizontally disposed fastening means pivotally connecting the other housing member and base member to the arm on one side of said tube and fastening means cooperable with the slots permitting the mounting of the base member and thus the tube on said arm at different angular positions relative thereto.

6. A device for measuring the diameter of logs comprising supporting means for positioning a log to be measured, fixed horizontal pivot means to one side of and above said supporting means, elongated arm means carried by said pivot means for rocking movement thereabout and including a free end extending outwardly from the pivot means to overhang a log positioned on the supporting means, a measuring device carried by the arm means at a position overlying said supporting means, log contacting means also carried by the free end of the arm means and depending beneath said measuring device and the free end of said arm means for engaging the periphery of a log to be measured, and said measuring device including a component movable independently of but in accordance with the angular movement of the arm means to different positions determined by engagement of the log contacting means with different size logs.

7. Mechanisms for measuring the diameter of different size logs comprising the combination of means for supporting a log to be measured, fixed horizontal pivot means above, to one side of, and parallel with the axis of such a log to be measured, and elongated arm means mounted on said fixed pivot means and including a free end extending so as to overhang a supported log and to be movable toward and away therefrom, a log contacting means depending beneath the free end of said arm means for engaging the periphery of logs to be measured, and a movable log size indicating device also carried by the free end of the arm means and including a downwardly bowed passage, said passage having an exposed transparent face, a rolling contact member within the passage and movable therein in accordance with changes in angular position of said arm means and indicia positioned alongside said passage, graduated upwards from the end thereof remote from said pivot means in a direction towards said pivot means and calibrated to indicate diameter of logs in accordance with the positions at which such rolling contact member stops within said passage in response to changes in angular position of said arm means relative to said fixed pivot means.

References Cited in the file of this patent

UNITED STATES PATENTS

| | | |
|---|---|---|
| 466,380 | Spencer | Jan. 5, 1892 |
| 685,569 | Bullard | Oct. 29, 1901 |
| 1,100,554 | Gee | June 16, 1914 |
| 1,432,212 | Schlaupitz | Oct. 17, 1922 |
| 2,375,322 | Pierce | May 8, 1945 |
| 2,795,320 | Dillingham | June 11, 1957 |

FOREIGN PATENTS

| | | |
|---|---|---|
| 459,691 | France | Sept. 12, 1913 |
| 948,818 | Germany | Sept. 6, 1956 |